United States Patent [19]
Nelson et al.

[11] Patent Number: 6,150,049
[45] Date of Patent: Nov. 21, 2000

[54] FLUID FLOW PLATE FOR DISTRIBUTION OF HYDRATION FLUID IN A FUEL CELL

[75] Inventors: Milton H. Nelson, Saratoga Springs; Charles M. Carlstrom, Jr., Clifton Park; Mathew J. Cusack, Brunswick, all of N.Y.; John R. Miller, Webster, Mass.

[73] Assignee: Plug Power Inc., Latham, N.Y.

[21] Appl. No.: 09/398,608

[22] Filed: Sep. 17, 1999

[51] Int. Cl.[7] .................................................. H01M 8/04
[52] U.S. Cl. ............................................. 429/39; 429/34
[58] Field of Search ........................................ 429/34, 39

[56] References Cited

U.S. PATENT DOCUMENTS

| | | | |
|---|---|---|---|
| 3,432,357 | 3/1969 | Dankese | 136/86 |
| 3,442,712 | 5/1969 | Roberts | 136/86 |
| 4,365,007 | 12/1982 | Maru et al. | 429/34 X |
| 4,678,724 | 7/1987 | McElroy | 429/34 |
| 5,382,478 | 1/1995 | Chow et al. | 429/26 |
| 5,482,680 | 1/1996 | Wilkinson et al. | 422/177 |
| 5,503,945 | 4/1996 | Petri et al. | 429/35 |
| 5,840,438 | 11/1998 | Johnson et al. | 429/30 |
| 5,906,898 | 5/1999 | Pondo | 429/34 |
| 5,912,088 | 6/1999 | Ernst | 429/34 X |

FOREIGN PATENT DOCUMENTS 58-119167A  7/1983  Japan.

*Primary Examiner*—John S. Maples
*Attorney, Agent, or Firm*—Heslin & Rothberg, P.C.

[57] ABSTRACT

A hydration system for a fuel cell includes a fluid flow plate having an inlet fluid opening for receiving a hydration fluid, a plurality of reactant flow channels defined in the fluid flow plate, at least one land interposed between the flow channels, and at least one hole defined in and extending through the land. The hole may be fluidly connected to the inlet fluid opening, thereby allowing a portion of the fluid to aid in hydration of a membrane of the fuel cell. A hydration channel also formed in the land may extend from an outlet of the hole to further aid membrane hydration.

8 Claims, 4 Drawing Sheets

FLUID FLOW PLATE FOR DISTRIBUTION OF HYDRATION FLUID IN A FUEL CELL

TECHNICAL FIELD

This invention relates generally to fuel cells and, more particularly, to fluid flow plates configured for improved distribution of hydration fluid.

BACKGROUND

Fuel cells electrochemically convert fuels and oxidants to electricity. A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). The direction, from anode to cathode, of flow of protons serves as the basis for labeling an "anode" side and a "cathode" side of every layer in the fuel cell, and in the fuel cell assembly or stack.

In general, an individual PEM-type fuel cell may have multiple, generally transversely extending layers assembled in a longitudinal direction. In a typical fuel cell assembly or stack, all layers which extend to the periphery of the fuel cells have holes therethrough for alignment and formation of fluid manifolds that generally service fluids for the stack. Typically, gaskets seal these holes and cooperate with the longitudinal extents of the layers for completion of the fluid supply manifolds. As may be known in the art, some of the fluid supply manifolds distribute fuel (e.g., hydrogen) and oxidant (e.g., air/oxygen) to, and remove unused fuel and oxidant as well as product water from, fluid flow plates which serve as flow field plates of each fuel cell. Other fluid supply manifolds circulate coolant (e.g., water) for cooling the fuel cell.

In a typical PEM-type fuel cell, the membrane electrode assembly (hereinafter "MEA") is sandwiched between "anode" and "cathode" gas diffusion layers (hereinafter "GDLs") that can be formed from a resilient and conductive material such as carbon fabric or paper. The anode and cathode GDLs serve as electrochemical conductors between catalyzed sites of the PEM and the fuel (e.g., hydrogen) and oxidant (e.g., air/oxygen) which flow in respective "anode" and "cathode" flow channels of respective flow field plates.

The PEM can work more effectively if it is wet. Therefore, once any area of the PEM dries out, the fuel cell does not generate any product water in that area because the electrochemical reaction there stops. Undesirably, this drying out can progressively march across the PEM until the fuel cell fails completely.

Attempts have been made to introduce water into the PEM by raising the humidity of the incoming reactant gases. That is, the fuel and oxidant gases are often humidified with water vapor before entering the fluid supply manifolds in order to convey water vapor for humidification of the PEM of the fuel cell.

For example, humidification of reactant gases (e.g., fuel and oxidant) is typically attempted by preconditioning the reactant gases at or before introduction of the reactant gases to the flow channels in a fluid flow plate. One method uses externally produced saturated air or hydrogen. Another method uses water injection at the start of each flow channel. Attempts to humidify or pre-mix the correct amount of water to reactant gas may be problematic due to one or more of the following: the water requirements are not constant from the start of a flow channel to the end of the flow channel; injecting large amounts of water in order to provide sufficient water and/or humidification at the end of the flow channel often creates one or more cold, wet spots in the cell adding to non-uniform operating temperature distributions and cell performance; injecting a set amount of water for the entire channel length at the start is often too much for the first quadrant, and too little further downstream; water requirements across the fuel cell, and along the length of a fuel cell stack, are not uniform but are dynamic and related to cell current densities; excess water may lead to localized flooding; and channel dimensions may be too small for effective atomization of injected water.

Problems also result from the use of water vapor in humidification of the reactant gases. For example, significant quantities of heat are required in order to saturate a reactant gas at a temperature close to the temperature of the fuel cell. Furthermore, temperature variations within the reactant gas supply manifolds and fuel cell plate channels can undesirably lead to condensation of the vapor and poor distribution of the reactant gas and vapor/water.

Deleterious effects can also result from turns in the flow path of a stream which is a mixture of water droplets and reactant gas (e.g., two-phase flow). After the stream goes around a given curve, separation of the water from the reactant gas occurs. Anytime the stream changes direction and/or velocity, the various settling rates yield separation. Therefore, by the time the stream reaches the end of such a flow path, much of the liquid water may have settled out. Similar problems and unpredictability can result in any unconstrained flow of water mixed with reactant gas.

Naturally, fuel cells within the same assembly or stack can have varying efficiencies. In particular, some fuel cells generate more heat than others. A fuel cell running hot will require more water in order to function. If a fuel cell assembly delivers inadequate moisture to a given fuel cell, then the PEM of that fuel cell begins to dry out, which causes it to run hotter since the remaining fuel cells in the assembly continue to force high current therethrough. When the PEM of a fuel cell completely dries out, that fuel cell begins to dry out adjacent fuel cells. Accordingly, it is desirable to deliver adequate water to all the fuel cells in the stack.

SUMMARY OF THE INVENTION

The invention provides a fuel cell fluid flow plate, a fuel cell hydration system and a method of distributing hydration fluid within a fuel cell employing a hole defined in and extending through a land adjacent a reactant flow channel. In an exemplary embodiment of the invention, a hydration system for a fuel cell comprises a fluid flow plate having an inlet fluid manifold for receiving a hydration fluid, a plurality of reactant flow channels defined in the fluid flow plate, at least one land interposed between the flow channels, and at least one hole defined in and extending through the land. The hole may be fluidly connected to the inlet fluid manifold, thereby allowing a portion of the fluid to hydrate at least a part of a membrane of the fuel cell.

This system has a number of advantages. The hydration hole is impinged against the gas diffusion layer, or alternatively, a wicking layer, thereby providing an additional pressure drop for the fluid exiting the hydration hole. The additional pressure drop properly controls the flow of the hydrating liquid to provide adequate hydration of the fuel cell membrane. As another advantage, large hydration holes may be selected so that flow plates incorporating them may be easily manufactured, for example, to facilitate large scale production. The number of hydration holes necessary may also be reduced, because one hole may aid in hydration of a portion of the membrane which corresponds to multiple flow channels. The wicking action of the gas diffusion layer and/or the wicking layer also serve to increase hydration distribution along the membrane of the fuel cell.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

DETAILED DESCRIPTION

The present invention provides a hydration system for a fuel cell and/or fuel cell assembly in which hydration holes in the lands of a flow channel of a fluid flow plate are used for addition and/or redistribution of a fluid. Such a hydration system is adaptable to providing a generally uniform and sufficient membrane hydration and/or cooling of an individual fuel cell, as well as providing a generally uniform and sufficient membrane hydration and/or cooling of a plurality of fuel cells throughout the length of a fuel cell stack.

In accordance with the principles of the present invention, a fuel cell is provided with a novel fluid flow plate which is operable to distribute a reactant gas to a membrane of the fuel cell, and to supply, and/or redistribute water for regulating membrane hydration and/or to provide fluid for cooling the fuel cell. The fluid flow plate of the present invention may include a surface having at least one flow channel, the flow channel being bounded by lands which define the sidewalls of the flow channel. A fluid is effectively and readily added to, removed and/or redistributed to the MEA through a hydration hole or holes in the lands of the flow plate.

Figure 1:
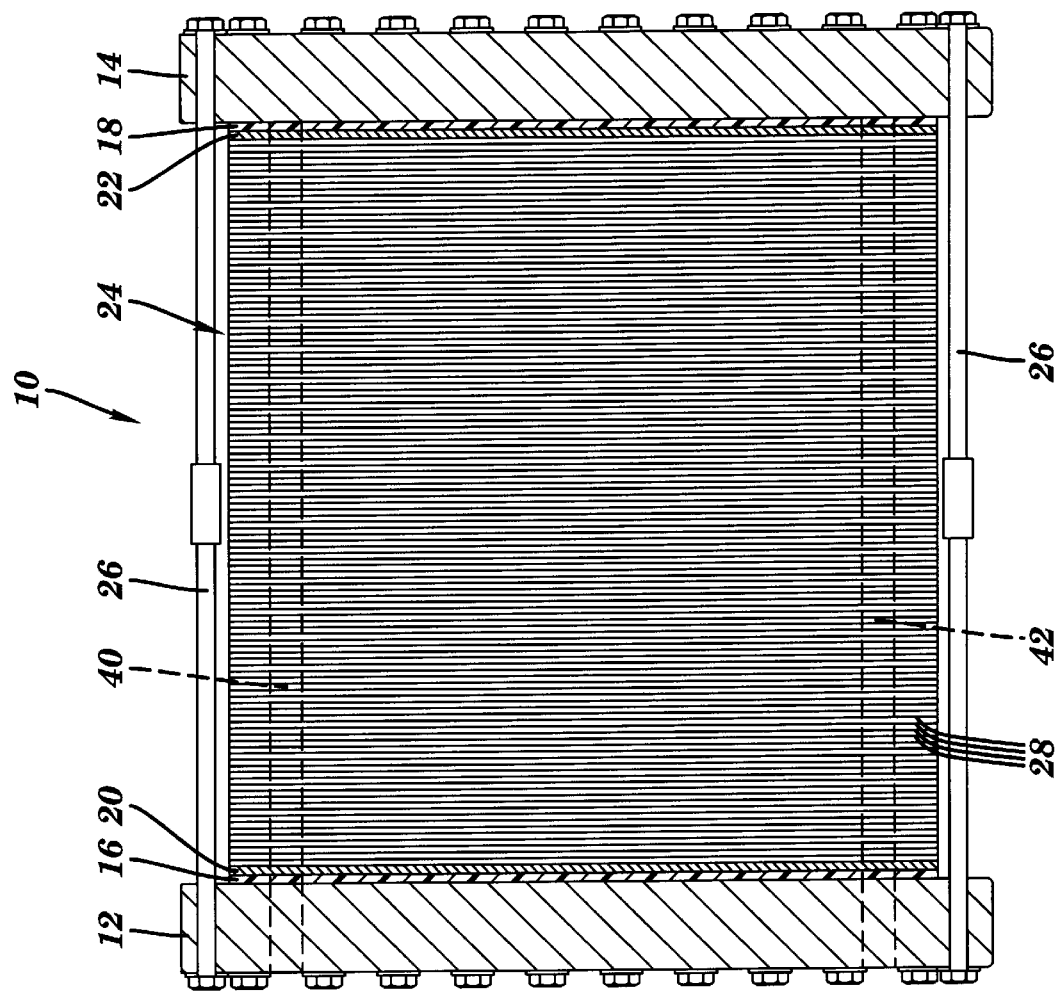
FIG. 1 is a front elevation view of one example of a fuel cell assembly incorporating and using a humidification system in accordance with the present invention.

An example of a fuel cell assembly incorporating novel features of the present invention is depicted in FIG. 1. In this exemplary embodiment, a fuel cell stack 10 includes end plates 12 and 14, insulation layers 16 and 18, and current collector/conductor plates 20 and 22, with a working section 24 therebetween. The working section includes one or more active sections and can include a selected number of cooling sections, as will be understood by those skilled in the art. In one aspect of the present invention, the one or more active sections can further serve to perform cooling for the fuel cell assembly. A number of structural members 26 can be employed to join end plate 12 to end plate 14.

Working section 24 includes a number of layers 28. The layers generally form fluid manifolds for supplying reactant gas or fluids to, removing fluids from, and otherwise communicating and/or servicing fluids as desired within working section 24, as will be appreciated by those skilled in the art. The layers of fuel cell stack 10 might have applied thereto compressive forces.

A plurality of layers 28 may form one or more PEM-type fuel cells. The construction and utilization of PEM fuel cells is known in the art. By connecting an external load (not shown) between electrical contacts (not shown) of current collector/conductor plates 20 and 22, one can complete a circuit for use of current generated by the one or more PEM-type fuel cells.

Figure 2:
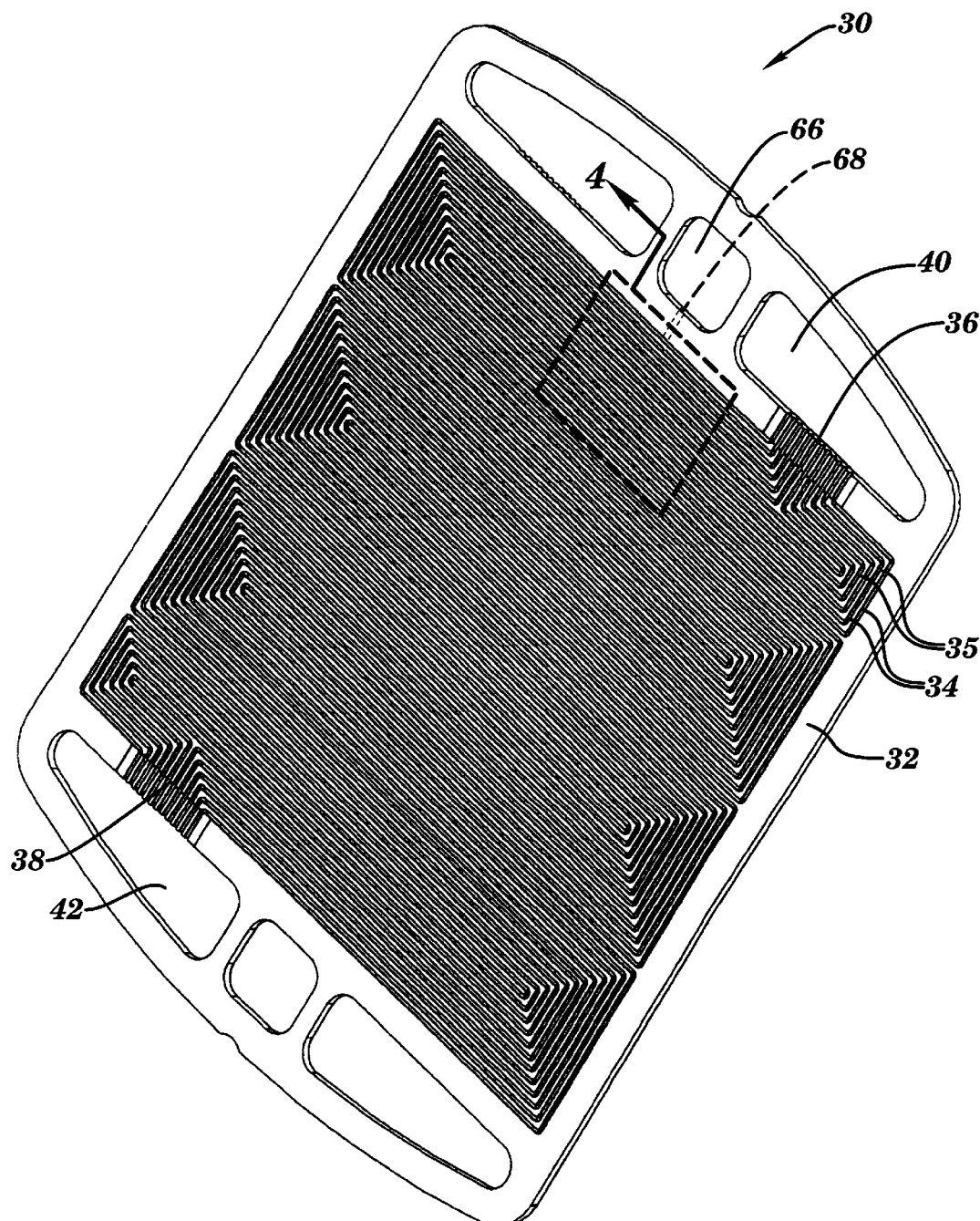
FIG. 2 is a side elevation view of one example of a fluid flow plate incorporating and using a humidification system in accordance with the present invention.

One example of a layer 28 of working section 24 is depicted in FIG. 2 as a fluid flow plate 30. Fluid flow plate 30 has a fluid flow face 32 with at least one generally serpentine flow channel 34 thereon. Flow channel 34 receives and transmits one or more fluids through an inlet 36 and out an outlet 38 which are in fluid communication with corresponding fluid entry manifold 40 and fluid exit manifold 42.

In the exemplary embodiment of FIG. 2, fluid flow plate 30 comprises a generally non-porous, planar, fluid flow face 32 in which is defined flow channel 34. Fluid flow face 32 may include a plurality of substantially straight and parallel lands 35 which define a number of substantially straight and parallel flow channel sections therebetween.

While multiple serpentine flow channels are illustrated in FIG. 2, it will be appreciated by those skilled in the art that the various embodiments of the fluid flow plates according to the present invention may include a plurality of continuous flow channels, e.g., a fluid flow plate having four quadrants, each with portions of a flow channel and/or separate flow channels, or a single flow channel having multiple sections.

Inlet 36 and outlet 38 may each comprise a hole (not shown) which extends through the thickness of fluid flow plate 30, e.g., transversely or on an angle, and which opens onto cutouts, on the opposite side of the fluid flow plate. The cutouts open onto entry fluid manifold 40 and exit manifold 42. Such a configuration and other equally suitable configurations as may be known in the art may be used for fluidly connecting the fluid manifolds to the flow channel. A given fluid flow plate may be formed from a conductive material such as graphite or any other suitable material as may be known in the art. As is known in the art, fluid flow plates may include bipolar and monopolar plates.

Flow field plates may be commonly produced by any of a variety of processes. One plate construction technique, which may be referred to as "monolithic" style, compresses carbon powder into a coherent mass. Next, the coherent mass is subjected to high temperature processes which bind the carbon particles together, and convert a portion of the mass into graphite for improved electrical conductivity. Then, the mass is cut into slices, which are formed into the flow field plates. Each flow field plate may be subjected to a sealing process (e.g., resin impregnation) in order to decrease gas permeation therethrough and reduce the risk of uncontrolled reactions. Flow field channels may be engraved or milled into a face of the rigid, resin impregnated graphite plate. Alternatively, the fluid flow plate may be injected molded with the flow channel formed on a surface of the plate.

In one example, fluid flow plate 30 serves as a flow field plate and flow channel 34 conducts fluid which includes reactant gas for fuel cell assembly 10. The reactant gas serves as fuel or oxidant for a given fuel cell. For instance, the flow channel can carry reactant gas (e.g., a fuel such as hydrogen or an oxidant such as air/oxygen) as well as a liquid (e.g., humidification and/or product water), as will be understood by those skilled in the art. In the context of this invention a reactant gas may be any substance which is classified as a fuel, such as substantially pure hydrogen, methanol reformate or natural gas reformate, or any substance classified as an oxidant such as substantially pure oxygen or oxygen containing air, as may be known in the art.

A gasketing material or gaskets may be employed to seal and cooperate with the longitudinal extents of layers 28 in formation of the fluid supply manifolds. A given gasket might take the form of, for instance, a frame gasket made from a polytetrafluoroethylene ("PTFE") material manufactured by E. I. Du Pont de Nemours Company and sold under the trademark TEFLON®. In another embodiment, multiple O-ring gaskets might be employed, however any suitable material or device may be used.

For purposes of illustration, FIG. 2 depicts a fluid hydration manifold 66 for supplying a fluid through fluid supply channel 68 to a series of hydration holes 65 (not shown) in lands 35 of plate 30. Fluid supply channel 68 is illustrated in this exemplary embodiment as a channel extending transversely to flow channels 34. However a variety of systems may be employed to supply hydration holes 65 with an adequate supply of fluid.

Figure 3:
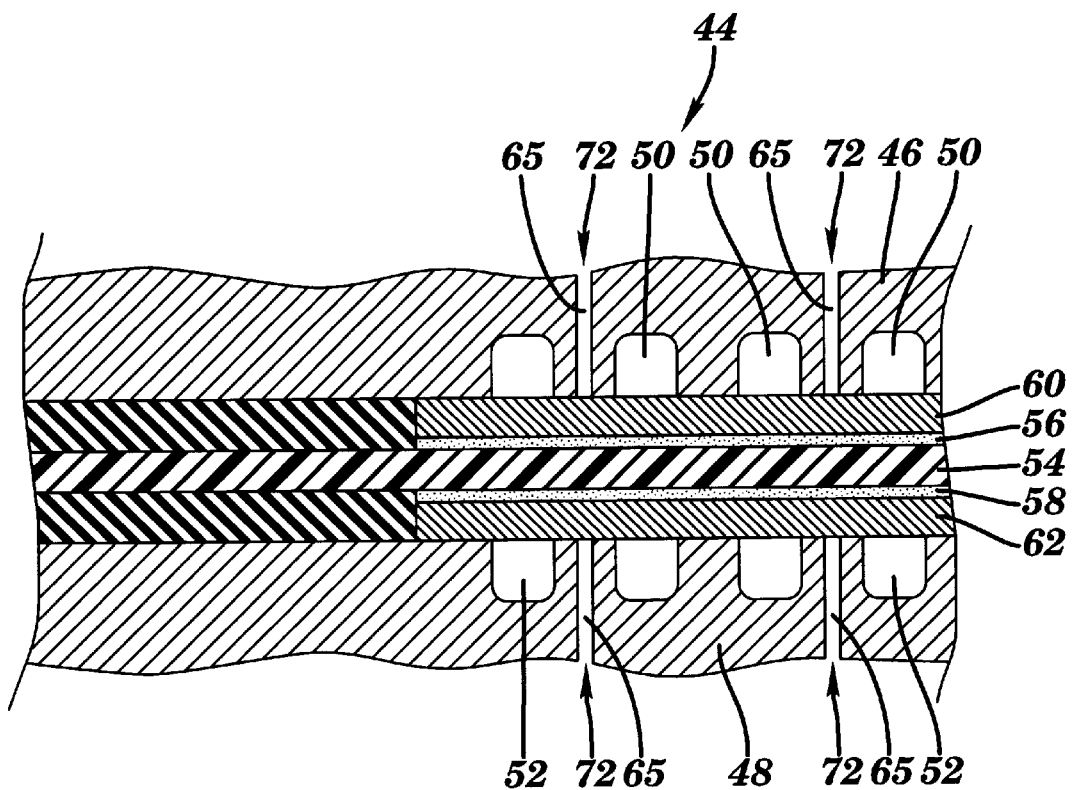
FIG. 3 is a partial cross sectional view of one example of a fuel cell incorporating and using a humidification system in accordance with the present invention.

For purposes of illustration, FIG. 3 depicts fuel cell 44 with fluid flow plates 46 and 48 serving as flow field plates. Fluid flow plates 46 and 48 may be of similar type and construction to fluid flow plate 30 described herein. In particular, fluid flow plate 46 might serve as an anode side of the fuel cell, and fluid flow plate 48 might serve as a cathode side of the fuel cell. That is, the face of fluid flow plate 46 might be an anode face, and the face of fluid flow plate 48 might be a cathode face. For instance, flow channel 50 of fluid flow plate 46 might carry hydrogen, as fuel, and humidification water. Further, a flow channel 52 of fluid flow plate 48 might carry air/oxygen, as oxidant, as well as humidification water and/or product water, as will be understood by those skilled in the art.

Fuel cell 44 includes a membrane or solid electrolyte 54. Preferably, solid electrolyte 54 is a solid polymer electrolyte made using a polymer such as a material manufactured by E. I. Du Pont de Nemours Company and sold under the trademark NAFION®. Further, an active electrolyte such as sulfonic acid groups might be included in this polymer. In another example, the solid polymer electrolyte might be formed with a product manufactured by W. L. Gore & Associates (Elkton, Md.) and sold under the trademark GORE-SELECT®. Moreover, catalysts 56 and 58 which facilitate chemical reactions, are applied to the anode and cathode sides, respectively, of solid electrolyte 54. Catalysts 56 and 58 may be constructed from platinum or other materials known in the art. This unit can be referred to as a "membrane electrode assembly" (hereinafter "MEA"). The MEA might be formed with a product manufactured by W. L. (Gore & Associates and sold under the trade designation PRIMEA 5510-HS.

The MEA is sandwiched between anode and cathode gas diffusion layers (hereinafter "GDLs") 60 and 62, respectively, which can be formed with a resilient and conductive material such as carbon fabric or carbon fiber paper. In one embodiment of gas diffusion layers 60 and 62, porous carbon cloth or paper is infused with a slurry of carbon black and sintered with TEFLON® material.

The anode and cathode GDLs serve as electrochemical conductors between catalyzed sites of solid polymer electrolyte 54 and the fuel (e.g., hydrogen) and oxidant (e.g., air/oxygen) which each flow in anode and cathode flow channels 50 and 52, respectively. Further, the GDLs also present to the surfaces of the MEA a combination of microscopic porosity and macroscopic porosity. Microscopic porosity allows reactant gas molecules to pass generally longitudinally from the flow channel to a surface of the MEA. Macroscopic porosity allows product water formed at the cathode surface of the MEA to be removed therefrom by flowing generally longitudinally into the cathode flow channel, to prevent flooding of the catalyst particles.

In this exemplary embodiment and the embodiments described below, an additional wicking layer comprised of a wicking material (not shown), or other material which transmits fluid, may be used to improve the fluid distribution and hydration of the MEA. Desirably, a porous or wicking material comprises small passageways therethrough which aid water flow via capillary action. In addition, hydrophilic and/or hydrophobic materials and/or coatings may be suitably employed to aid in the addition and/or removal of water from the MEA, and to aid in the distribution of a fluid though fuel cell stack 10.

As shown in FIG. 3, a hydration hole 65 may be provided in a fluid flow plate which is in fluid communication with the MEA. As explained in greater detail below, hydration hole 65 distributes a supply of fluid, such as de-ionized water, to the MEA through the land portion of the fluid flow plate. Hydration hole 65 may be impinged on the GDL as shown in FIG. 3 or alternatively hydration hole 65 may be impinged against a wicking material. The impingement of hydration hole 65 against the GDL, or other material, creates a pressure differential in the flow of fluid through hydration holds 65. This pressure differential allows a fluid to be evenly distributed through multiple hydration holes simultaneously, thereby controlling the flow of the fluid.

Figure 4:
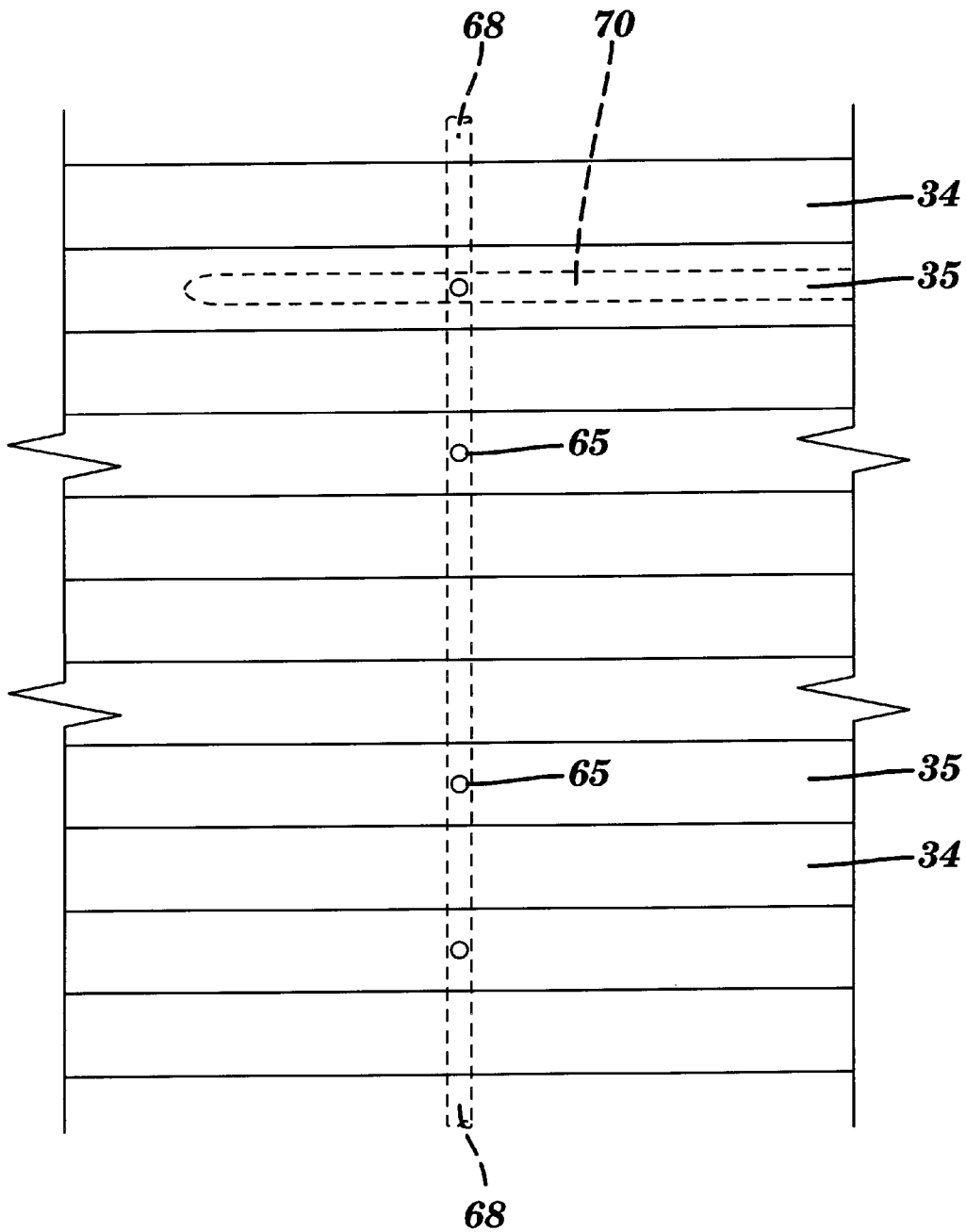
FIG. 4 is a partial side elevation view taken along line 4 of FIG. 2.

As illustrated in FIG. 4, hydration holes 65 are located on a land 35 of flow channels 34. In the context of this invention, land 35 represents the portion of fluid flow face 32 interposed between a pair of flow channels, or adjacent a single flow channel which has changed direction to create a median bounded by the flow channels. The top face of land portion 35 is substantially planar with fluid flow face 32.

Hydration holes 65 may be located on every land, every other land, every third land or as may be necessary to adequately distribute water to the MEA. Also hydration holes 65 may be spaced at varying intervals to adequately distribute water to the MEA. The size of hydration holes 65 may be uniform across the entire active section of the fluid flow plate, or alternatively the sizes of the holes may increase or decrease as necessary to achieve adequate pressurization, and therefore proper flow control of the fluid. Similarly, fluid supply channel 68 may increase or decrease in cross-sectional diameter to maintain adequate pressurization, thereby allowing even distribution of fluid through hydration holes 65. As the fluid is supplied through hydration hole 65, wicking action distributes the fluid throughout a portion of the GDL or wicking layer.

The rate of fluid transport through hydration holes 65 to the GDL or wicking layer is a function of the operable surface area of the hydration hole, the temperature, and the differential pressure. For example, by providing a dense wicking material the supply of fluid can be operated at a suitable pressure to cause a flow of the fluid to enter the wicking material and be distributed to the MEA.

In addition to hydration hole 65, a hydration channel, or groove 70 (shown in phantom lines) may be used to further distribute the fluid. Hydration channel 70 has a volume defined within land 35 sufficient to allow fluid to collect prior to distribution through the GDL or wicking layer. Hydration channel 70 may extend longitudinally along land 35 to a point which is determined to aid in providing sufficient hydration to the MEA. Also hydration channel 70 may be used on every hydration hole or only a portion of the hydration holes and each individual channel 70 may vary in configuration, length, width and depth as necessary.

During operation, fluid flows through fluid hydration manifold 66 and into fluid supply manifold 68. Once in fluid supply manifold 68 the fluid then travels through hydration holes 65 in the direction of arrows 72 (FIG. 3). It will be appreciated that our invention is not limited with respect to particular manifold configurations or whether the manifolds or openings are formed on the plate or external to the plate. The fluid flow is impinged against the GDL, thereby allowing the wicking action of the GDL to distribute the fluid. The distribution of fluid through a portion of the GDL aids in hydration of the MEA.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed:

1. A fluid flow plate for a fuel cell, said fluid flow plate having a face and a hydration fluid opening for receiving a hydration fluid, said fluid flow plate comprising:

at least one flow channel for distributing a reactant in said fuel cell, said flow channel having a volume defined within said face;

at least one land, said land having a height and a width and said land being located adjacent to said reactant flow channel;

at least one hole defined in and extending through the height of said land, said hole being fluidly connected to said hydration fluid opening, said hole facilitating transmission of a portion of said hydration fluid to aid in hydration of a membrane of said fuel cell.

2. A hydration system for a fuel cell comprising:

a fluid flow plate, said fluid flow plate having a hydration fluid opening for receiving a hydration fluid;

a plurality of reactant flow channels defined in said fluid flow plate;

at least one land interposed between said reactant flow channels, said land having a height and a width;

at least one hole defined in and extending through the height of said land, said hole being fluidly connected to said hydration fluid opening, said hole facilitating transmission of a portion of said hydration fluid to aid in hydration of a membrane of said fuel cell.

3. A hydration system as in claim 2, wherein said hydration fluid comprises deionized water.

4. A hydration system as in claim 2, wherein said hole has an inlet and an outlet, said outlet being impinged against a wicking member.

5. A hydration system as in claim 4, wherein said wicking member comprises a gas diffusion layer.

6. A hydration system as in claim 4, wherein said wicking member distributes said hydration fluid to said membrane.

7. A hydration system as in claim 2, wherein said fuel cell is located in a fuel cell stack, said fuel cell stack comprising a plurality of fuel cells.

8. A hydration system as in claim 2, wherein said land has a groove defined therein, said groove being fluidly connected to said hole.

* * * * *